US011826728B2

(12) United States Patent
Monnier et al.

(10) Patent No.: US 11,826,728 B2
(45) Date of Patent: Nov. 28, 2023

(54) THERMALLY STABLE POROUS CATALYST SYSTEMS AND METHODS TO PRODUCE THE SAME

(71) Applicants: UNIVERSITY OF SOUTH CAROLINA, Columbia, SC (US); BATTELLE ENERGY ALLIANCE, LLC, Idaho Falls, ID (US)

(72) Inventors: John Monnier, Columbia, SC (US); Weijian Diao, Cayce, SC (US); John Regalbuto, Columbia, SC (US); John Meynard Tengco, Columbia, SC (US); Daniel M. Ginosar, Idaho Falls, ID (US)

(73) Assignees: UNIVERSITY OF SOUTH CAROLINA, Columbia, SC (US); BATTELLE ENERGY ALLIANCE, LLC, Idaho Falls, ID (US)

(*) Notice: Subject to any disclaimer, the term of this patent is extended or adjusted under 35 U.S.C. 154(b) by 682 days.

(21) Appl. No.: 16/592,802

(22) Filed: Oct. 4, 2019

(65) Prior Publication Data
US 2020/0188886 A1 Jun. 18, 2020

Related U.S. Application Data

(60) Provisional application No. 62/778,579, filed on Dec. 12, 2018.

(51) Int. Cl.
*B01J 23/42* (2006.01)
*B01J 35/00* (2006.01)
(Continued)

(52) U.S. Cl.
CPC .............. *B01J 23/42* (2013.01); *B01J 23/28* (2013.01); *B01J 23/30* (2013.01); *B01J 23/462* (2013.01);
(Continued)

(58) Field of Classification Search
None
See application file for complete search history.

(56) References Cited

U.S. PATENT DOCUMENTS

| 4,748,144 A | 5/1988 | Monnier et al. |
| 5,081,096 A | 1/1992 | Monnier et al. |

(Continued)

FOREIGN PATENT DOCUMENTS

WO  WO-2017187454 A1 * 11/2017 ............. B01J 21/04

OTHER PUBLICATIONS

Bartholomew, et al. "Fundamentals of Industrial Catalytic Processes" *John Wiley & Sons, Inc.* (2006) pp. 274-286.
(Continued)

*Primary Examiner* — Colin W. Slifka
(74) *Attorney, Agent, or Firm* — DORITY & MANNING, P.A

(57) ABSTRACT

This disclosure provides compositions and methods directed to thermally stable catalyst systems, which display stable physical properties and/or stable catalytic properties after thermal pretreatment at a temperature in the range of about 600° C. to about 1000° C. The catalyst systems include metal particles which contain a stable metal and a catalytic metal deposited on a porous support. Embodiments of the disclosure include catalyst systems that can be used in high temperature applications such as the hybrid sulfur cycle. The hybrid sulfur cyclic is an elevated temperature and high acid reaction that may be conducted using concentrated sulfuric acid heated to 800° C. Embodiments of the disclosure can provide thermally stable catalysts and methods to produce thermally stable catalysts that remain active for at least 80 hours' exposure to these harsh conditions.

13 Claims, 3 Drawing Sheets

(51) Int. Cl.
| | |
|---|---|
| B01J 23/46 | (2006.01) |
| B01J 23/30 | (2006.01) |
| B01J 23/28 | (2006.01) |
| B01J 23/745 | (2006.01) |
| B01J 23/75 | (2006.01) |
| B01J 37/02 | (2006.01) |
| B01J 37/30 | (2006.01) |
| B01J 37/34 | (2006.01) |
| B01J 37/16 | (2006.01) |
| B01J 37/03 | (2006.01) |
| B01J 35/10 | (2006.01) |

(52) U.S. Cl.
CPC .......... *B01J 23/464* (2013.01); *B01J 23/468* (2013.01); *B01J 23/745* (2013.01); *B01J 23/75* (2013.01); *B01J 35/008* (2013.01); *B01J 35/1009* (2013.01); *B01J 35/1014* (2013.01); *B01J 35/1038* (2013.01); *B01J 35/1061* (2013.01); *B01J 37/0201* (2013.01); *B01J 37/031* (2013.01); *B01J 37/16* (2013.01); *B01J 37/30* (2013.01); *B01J 37/348* (2013.01)

(56) References Cited

U.S. PATENT DOCUMENTS

| | | | |
|---|---|---|---|
| 10,016,751 | B2 | 7/2018 | Monnier et al. |
| 2007/0105007 | A1 | 5/2007 | Regalbuto et al. |
| 2009/0117257 | A1 | 5/2009 | Monnier et al. |
| 2009/0220682 | A1 | 9/2009 | Monnier et al. |
| 2014/0086823 | A1* | 3/2014 | Takeshima ............. B01J 23/888 423/658.2 |
| 2016/0136632 | A1 | 5/2016 | Monnier et al. |
| 2021/0221683 | A1* | 7/2021 | Upadhyayula ........... B01J 23/42 |

OTHER PUBLICATIONS

Beard, et al. "Preparation and structural analysis of carbon-supported Co core/Pt shell electrocatalysts using electroless deposition methods" *ACS Nano* 3(9) (2009) pp. 2841-2853.

Conte, et al. "Modifications of the metal and support during the deactivation and regeneration of Au/C Catalysts for the hydrochlorination of acetylene" *Catal. Sci. Technol.* 3 (2013) pp. 128-134.

Corgnale, et al. "Solar hydrogen production by the hybrid sulfur process" *Int'l J. Hydrog. Energy* 36 (2011) 11604-11619.

Corgnale, et al. "Solar hybrid sulfur cycle water-splitting process" SRNL-STI-2015e00546 Rev 0 (2015).

De Falco, et al. "$CO_2$: A Valuable Source of Carbon" *Green Energy Techn. Ser.* Springer (2013) pp. 1-202.

Djokić, S.S. "Modern Aspects of Electrochemistry—Ch. 2: Electroless deposition of metals and alloys" Springer No. 35 (2002) pp. 51-133. (Abstract Preview only).

Er-Rbib, et al. "Production of synthetic gasoline and diesel fuel from dry reforming of methane" *Energy Proc.* 29 (2012) pp. 156-165.

Ertl, et al. "Handbook of Heterogeneous Catalysis" *Wiley-VCH* (1997) pp. 1-386.

Ginosar, et al. "Stability of supported platinum sulfuric acid decomposition catalysts for use in thermochemical water splitting cycles" *Int'l J. Hydrog. Ener.* 32 (2007) pp. 482-488.

Hao, et al. "A fundamental study of Pt adsorption onto carbon: Adsorption equilibrium and particle synthesis" *J. Catal.* 279 (2011) pp. 48-65.

Luo, et al. "Probing the magic numbers of alumina-magnesium cluster anions and their reactivity toward oxygen" *J. Am. Chem. Soc.* 135 (2013) pp. 4307-4313.

Mezey, et al. "The surface free energies of solid chemical elements: Calculations from internal free enthalpies of atomization" *Jap. J. Appl. Phys.* 21 (1982) pp. 1569-1571.

Navarro, et al. "Renewable syngas production via dry reforming of methane by $CO_2$: A valuable source of carbon" *Green Energy Techn. Ser.* Springer (2013) pp. 45-66.

O'Connell, et al. "The Curious Relationship of Sintering to Activity in Supported Gold Catalysts for the Hydrochlorination of Acetylene" *Appl. Catal. B: Environ.* 225 (2017) pp. 264-272.

O'Connell, K. "Characterization, Synthesis and Stabilization of Au Based Bimetallic Catalysts for the Hydrochlorination of Acetylene" *U. South Carolina* (2016) pp. 1-121.

O'Connell, et al. "Surface Free Energy Stabilization of Au Shells over Noble Metal Cores for the Hydro-dechlorination of Acetylene" *251st ACS Meeting* (Mar. 2016).

O'Connell, et al. "Controlling Au Particle Sintering During the Hydrochlorination of Acetylene Using Core-Shell Bimetals" *24th N. Am. Catal. Soc. Meet.* (2015) p. 1.

O'Keefe, et al. "Catalysis research in thermochemical water-splitting processes" *Catal. Rev. Sci. Eng.* 22(3) (1980) pp. 325-369. (Abstract only).

Overbury, et al. "The surface composition of binary systems. Prediction of surface phase diagrams of solid solutions" *Chem. Rev.* 75(5) (1975) pp. 547-560.

Petkovic, et al. "Pt/$TiO_2$ (rutile) catalysts for sulfuric acid decomposition in sulfur-based thermochemical water-splitting cycles" *Appl. Catal. A: Gen.* 338 (2008) pp. 27-36.

Rashkeev, et al. "Catalytic activity of supported metal particles for sulfuric acid decomposition reaction" *Catal. Today* 139 (2009) pp. 291-298.

Rebelli, et al. "Preparation and characterization of silica-supported, Group IB—Pd bimetallic catalysts prepared by electroless deposition methods" *Catal. Today* 160 (2011) pp. 170-178.

Reber, et al. "Effect of N- and P-Type Doping on the Oxygen-Binding Energy and Oxygen Spillover of Supported Palladium Clusters" *J. Phys. Chem.* 118 (2014) pp. 20306-20313.

Reber, et al. "Cooperative effects in the oxidation of CO by palladium oxide cations" *J. Chem. Phys.* 135:234303 (2011) pp. 1-7.

Regalbuto, J.R. "Synthesis of Solid Catalysts—Ch. 3: Electrostatic Adsorption" *Wiley-VCH* (2009).

Roach, et al. "Crystal field effects on the reactivity of aluminum-copper cluster anions" *Phys. Rev. B* 81:195404 (2010) pp. 1-5.

Roach, et al. "Complementary active sites cause size-selectivity of aluminum cluster anions with water" *Science* 323 (2009) pp. 492-495.

Schaal, et al. "Characterization and evaluation of Ag—Pt/$SiO_2$ catalysts prepared by electroless deposition" *J. Catal.* 254 (2008) pp. 131-143.

Skriver, et al. "Surface energy and work function of elemental metals" *Phys. Rev. B* 46(11) (1992) pp. 7157-7168.

Wittanadecha, et al. "Preparation of Au/C catalysts using microwave-assisted and ultrasonic-assisted methods for acetylene hydrochlorination" *Appl. Catal A: Gen.* 475 (2014) pp. 292-296.

Zhang, et al. "Progress on cleaner production of vinyl chloride monomers over non-mercury catalysts" *Front. Chem. Sci. Eng.* 5(4) (2011) pp. 514-520.

* cited by examiner

THERMALLY STABLE POROUS CATALYST SYSTEMS AND METHODS TO PRODUCE THE SAME

CROSS REFERENCE TO RELATED APPLICATION

This application claims filing benefit of U.S. Provisional Application Ser. No. 62/778,579, having a filing date of Dec. 12, 2018, and which is incorporated herein by reference in its entirety.

STATEMENT AS TO RIGHTS TO INVENTIONS MADE UNDER FEDERALLY SPONSORED RESEARCH

This invention was made with Government support under Contract Nos. DE-EE0008091 and DE-AC07-05-ID14517, awarded by the Department of Energy (DOE). The Government has certain rights in the invention.

BACKGROUND

High temperature applications, such as the decomposition of $H_2SO_4$ to form $H_2O+SO_2+\frac{1}{2}O_2$, can be extremely difficult to perform and can pose safety issues due to the hazardous materials and conditions needed to sustain reaction. The metal-catalyzed decomposition of $SO_3$ to $SO_2+\frac{1}{2}O_2$ is the key step for thermochemical formation of $H_2$ and $O_2$ in the hybrid sulfur cycle. Conventional supported catalysts undergo rapid sintering, or aggregation, of the active catalyst particles due to the extreme conditions, which can include temperatures of 800° C. or greater.

Catalyst deactivation increases operating expenses that can disincentivize investment in alternative energy chemical processes such as the hybrid sulfur cycle. While some research has shown that tantalum oxide can be used as a support at temperatures of about 600° C., there is still a need for thermally stable catalyst systems that can be used at even higher temperatures. Ideally, catalyst deactivation should be negligible even at these elevated temperatures so that activity is stable for up to 80 hours.

Needed in the art are improved catalyst systems that display stable activity when used under high temperature, high acidity conditions.

SUMMARY OF THE INVENTION

This disclosure provides compositions and methods directed to thermally stable catalyst systems which display stable physical properties and/or stable catalytic properties after thermal pretreatment at a temperature in the range of about 600° C. to about 1000° C. The catalyst systems include metal particles which contain a stable metal and a catalytic metal deposited on a porous support.

Embodiments of the disclosure include catalyst systems that can be used in the hybrid sulfur cycle. The hybrid sulfur cyclic is an elevated temperature and high acid reaction that may be conducted using concentrated sulfuric acid heated to 800° C. Embodiments of the disclosure can provide thermally stable catalysts and methods to produce thermally stable catalysts that remain active for at least 80 hours exposure to these harsh conditions.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

Figure 1:
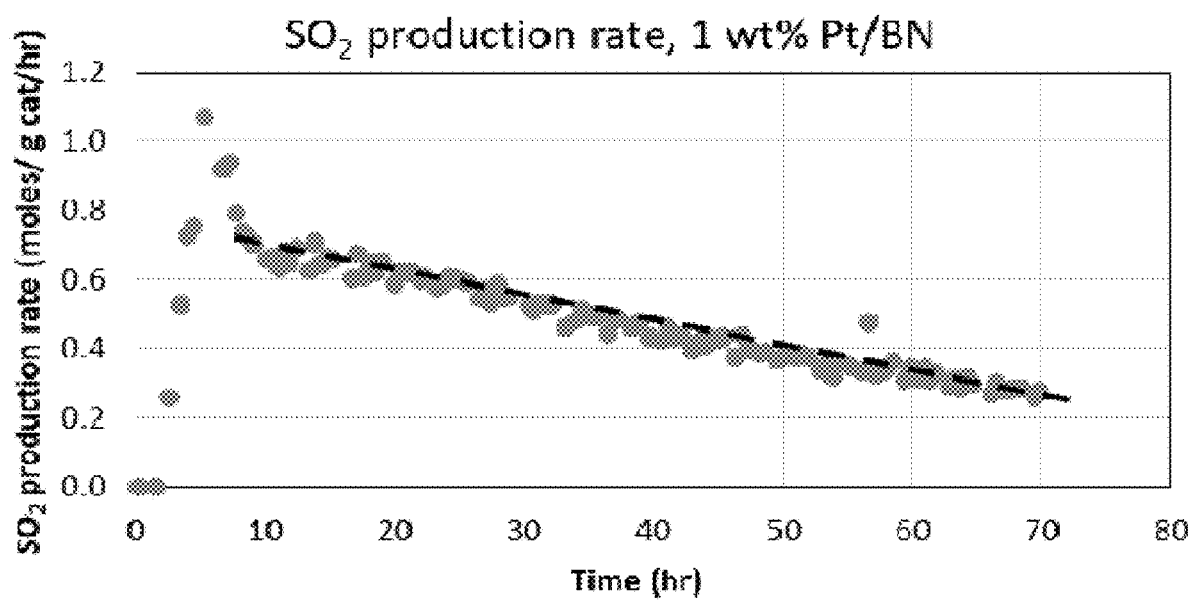
FIG. 1 illustrates a graph displaying the performance of a comparative catalyst system in an example high-temperature reaction that shows $SO_2$ production rate versus time.

Repeat use of reference characters in the present specification and drawings is intended to represent the same or analogous features or elements of the present invention.

DETAILED DESCRIPTION

Reference will now be made to embodiments of the disclosure, one or more examples of which are set forth below. Each example is provided by way of an explanation, not as a limitation. In fact, it will be apparent to those skilled in the art that various modifications and variations can be made without departing from the scope or spirit of the disclosure. For instance, features illustrated or described as one embodiment can be used on another embodiment to yield still a further embodiment. Thus, it is intended that the present disclosure cover such modifications and variations as come within the scope of the appended claims and their equivalents. It is to be understood by one of ordinary skill in the art that the present discussion is a description of exemplary embodiments only and is not intended as limiting the broader aspects of the present disclosure, which broader aspects are embodied exemplary constructions.

Generally, the present disclosure is directed to thermally stable catalyst systems and methods for producing such thermally stable catalyst systems. In an embodiment, the thermally stable catalyst system includes a porous support having a plurality of metal particles deposited on the support. The thermally stable catalyst system can be especially useful for catalyzing reactions greater than 600° C., and embodiments of the catalyst system have in some cases undergone a thermal pretreatment, such as calcining at a temperature in the range of about 600° C. to about 1000° C.

For embodiments of the disclosure, the porous support can be characterized as having physical properties that include a surface area, a pore volume, and an average pore diameter. These physical properties can be determined by many different methods (e.g., adsorption, microscopy, and combinations of techniques).

As a non-limiting example, Brunauer-Emmett-Teller (BET) methods can be used to determine the surface area and/or pore volume of the support at different temperatures. Average pore diameters can be determined by nitrogen adsorption/desorption isotherms and calculated using the Barrett-Joyner-Halenda (BJH) method. Both surface area and pore analyses can then be extracted from the data analyzer.

In some example embodiments of the catalyst system, the porous support can have a surface area in the range of about of about 8 $m^2/g$ to about 85 $m^2/g$. For certain embodiments, the porous support can have a surface area in the range of about of about 10 $m^2/g$ to about 75 $m^2/g$. In some embodiments, the porous support can have a surface are in the range of about 30 $m^2/g$ to about 70 $m^2/g$. Some example embodiments may have surface areas in the range of about 45 $m^2/g$ to about 68 $m^2/g$.

In embodiments of the catalyst system, the porous support can have a pore volume in the range of about 20 mm³/g to about 250 mm³/g. In certain embodiments, the porous support can have a pore volume in the range of about 40 mm³/g to about 220 mm³/g. In some embodiments, the porous support can have a pore volume in the range of about 100 mm³/g to about 200 mm³/g. Some example embodiments may have surface areas in the range of about 150 mm³/g to about 195 mm³/g.

In embodiments of the catalyst system, the porous support can have an average pore diameter in the range of about 11.5 nm to about 14.2 nm. In some embodiments, the porous support can have an average pore diameter in the range of about 11.8 nm to about 14.0 nm. In certain embodiments, the porous support can have an average pore diameter in the range of about 12.0 nm to about 13.8 nm. Some example embodiments can have an average pore diameter in the range of about 13.0 nm to about 13.8 nm.

In embodiments of the disclosure, the porous support can be made from or can include many different materials. Some example materials that can be used as the porous support include various kinds of carbon and/or a metal oxide (e.g., alumina, silica, titania, zirconia, silica-alumina, niobia or mixtures thereof). In an embodiment, the support includes carbon. The carbon support can exist as graphite, carbide, graphene, and/or carbon nanotubes. Other supports can be composed of materials different from metal oxides or carbon. Such supports include silicon carbide, boron nitride, and other metal nitrides.

In an exemplary embodiment, the porous support can include boron nitride, titanium dioxide, silicon carbide, silicon nitride, or combinations of these materials.

In embodiments of the disclosure, the plurality of metal particles can include at least two metals: a catalytic metal that is present on a portion of the surface of the metal particle, and a stable metal. In certain embodiments, the plurality of metal particles can include a second catalytic metal and/or a second stable metal.

An embodiment of the disclosure can include a catalyst system including a porous support deposited with a plurality of metal particles, each metal particle including a catalytic metal and a stable metal. In such embodiments, the catalytic metal can have a catalytic metal weight percent (wt %) and the stable metal can have a stable metal weight percent (wt %). In some embodiments, the catalytic metal weight percent and the stable metal weight percent can be the same. For example, a catalyst system can include a plurality of metal particles, where the metal particles include a stable metal (e.g., 1 wt % Ir) and a catalytic metal (e.g., 1 wt % Pt). In other embodiments, the catalytic metal can be present at a higher weight percentage relative to the stable metal. In still other embodiments, the catalytic metal can be present at a lower weight percentage relative to the stable metal. Thus, different metal compositions can be used in practice with embodiments of the disclosure.

Many different metals can be used to produce embodiments of the metal particles. Generally, the catalytic metal and the stable metal each include a metal described in Table 1.

TABLE 1

Metals and Metal Properties

| Metal | Melting Point (° C.) | Surface Energy (ergs/cm²) |
|---|---|---|
| Ag | 962 | 1302 |
| Au | 1064 | 1626 |
| Cu | 1083 | 1934 |
| Pd | 1554 | 2043 |
| Ni | 1453 | 2364 |
| Pt | 1772 | 2691 |
| Co | 1495 | 2709 |
| Rh | 1966 | 2828 |
| Mo | 2617 | 2877 |
| Fe | 1535 | 2939 |
| Nb | 2468 | 2983 |
| Re | 3180 | 3109 |
| Ir | 2410 | 3231 |
| Ru | 2310 | 3409 |
| W | 3410 | 3468 |

In embodiments of the disclosure, the stable metal preferably includes a metal with a higher surface energy than the catalytic metal. For example, in embodiments wherein the catalytic metal includes platinum (Pt), the stable metal can include one or more of Co, Rh, Mo, Fe, Nb, Re, Ir, Ru, or W. As an example, a catalyst system as disclosed herein can include a support having a plurality of particles that include Ir as the stable metal and Pt as the catalytic metal deposited on the surface of the support. In certain embodiments, the metal particles can be bimetallic. As defined herein, a bimetallic particle, contains only two metals from Table 1.

In some embodiments, the metal particles can include an arrangement of the catalytic metal and the stable metal. In these embodiments, the metal particles can include a core-shell arrangement. For example, the metal particles can include a core region having all or a majority of the stable metal, and a shell region located on the surface of the core region, the shell region having a majority of the catalytic metal. Thus, in these embodiments, the shell region is mostly in contact with the metal in the core region rather than in contact with the support.

In other embodiments, the metal particles can include an alloy composed of the catalytic metal and the stable metal. In some of these embodiments, the catalytic metal and the stable metal can produce a substantially homogenous alloy particle. In other embodiments, the particle composed of the catalytic metal and the stable metal can segregate into 2 or more phases that can include the catalytic metal, the stable metal, and an alloy.

As a non-limiting example embodiment, the stable catalyst system can include a porous support containing metal particles having a core-shell arrangement. The material for the porous support includes boron nitride (BN), and the particles can include a core containing Ir and a shell containing Pt. The physical properties of the example stable catalyst system after thermal pretreatment at a temperature of about 500° C. to about 1000° C. include a surface area in the range of about 45 m²/g to about 68 m²/g, a pore volume in the range of about 150 mm³/g to about 195 mm³/g, and an average pore diameter in the range of about 13.0 nm to about 13.8 nm.

Generally, embodiments of the stable catalyst system display stable physical properties after calcining. The calcine pretreatment can be conducted over a range of temperatures. In some embodiments, the thermal pretreatment occurs at a temperature in the range of about 500° C. to about 1000° C. In certain embodiments, the thermal pretreatment occurs at a temperature in the range of about 550°

C. to about 900° C. In certain embodiments, the thermal pretreatment occurs at a temperature in the range of about 600° C. to about 800° C.

In the description presented, ranges should be held as inclusive of the endpoints. For example, a temperature range of about 600° C. to about 800° C. includes the temperatures 600° C., 601° C., 601° C., 603° C. . . . 800° C., along with intervening temperatures (e.g., 600.5° C.).

Another embodiment of the disclosure is a method of forming a thermally stable catalyst system, such as the catalyst systems described herein, which includes the steps: depositing a plurality of particles, each particle including a stable metal and a catalytic metal, onto a porous support to generate a protocatalyst and calcining the protocatalyst at a temperature in the range of about 500° C. to about 1000° C. to generate the catalyst system. In these embodiments, calcining the protocatalyst results in a change in the physical properties of the support, but does not result in support collapse, providing the thermally stable embodiments.

In embodiments of the disclosure, the method for forming a thermally stable catalyst system produces a change in the surface area of the catalyst support. In some embodiments, calcining the protocatalyst at a temperature in the range of about 500° C. to about 1000° C. reduces the porous support surface area by less than about 85%. For certain embodiments, calcining at a temperature in the range of about 500° C. to about 1000° C. reduces the porous support surface area by less than about 20%. In some embodiments, calcining at a temperature in the range of about 500° C. to about 1000° C. reduces the porous support surface area by less than about 15%. In certain embodiments, calcining at a range of about 500° C. to about 1000° C. reduces the porous support surface area by less than about 12%.

In embodiments of the disclosure, the method for forming a thermally stable catalyst system produces a change in the pore volume of the catalyst support. In some embodiments, calcining the protocatalyst at a temperature in the range of about 500° C. to about 1000° C. reduces the porous support pore volume by less than about 85%. For certain embodiments, calcining at a temperature in the range of about 500° C. to about 1000° C. reduces the porous support pore volume by less than about 20%. For some embodiments, calcining at a temperature in the range of about 500° C. to about 1000° C. reduces the porous support pore volume by less than about 15%.

In embodiments of the disclosure, the method for forming a thermally stable catalyst system produces a change in the average pore diameter of the catalyst support. In some embodiments, calcining the protocatalyst at a temperature in the range of about 500° C. to about 1000° C. reduces the porous support average pore diameter by less than about 45%. For certain embodiments, calcining at a temperature in the range of about 500° C. to about 1000° C. reduces the porous support average pore diameter by less than about 20%. In certain embodiments, calcining at a temperature in the range of about 500° C. to about 1000° C. reduces the porous support surface area by less than about 10%. For some embodiments, calcining at a range of about 500° C. to about 1000° C. reduces the porous support surface area by less than about 5%.

For embodiments of the method for forming a thermally stable catalyst, the porous support can include a variety of materials. A non-limiting list of example materials that can be used as the porous support include various kinds of carbon and/or a metal oxide (e.g., alumina, silica, titania, zirconia, silica-alumina, niobia or mixtures thereof). In an embodiment, the support includes carbon. The carbon support can exist as graphite, carbide, graphene, and/or carbon nanotubes. Other supports can be composed of materials different from metal oxides or carbon. Such supports include silicon carbide, boron nitride, and other metal nitrides.

In certain embodiments, the thermally stable catalyst may include a support having one or more materials from the following group: boron nitride, titanium dioxide, silicon carbide, silicon nitride.

An embodiment of the disclosure can include a method of forming a thermally stable catalyst system by depositing a plurality of metal particles, each metal particle including a catalytic metal and a stable metal on a porous support. In such embodiments, the catalytic metal and the stable metal can be deposited in an order, such as the catalytic metal being deposited first, followed by depositing the stable metal or vice versa. Alternatively, or additionally, the catalytic metal and the stable metal can be deposited at substantially the same time or can be deposited as an alloy. By using different deposition rates, the weight percentage and position of the catalytic metal and the stable metal can be controlled. As an example, the catalytic metal can be deposited at a deposition rate and over a deposition time to produce a catalytic metal weight percent (wt %) on the support. Before, after, or at the same time, the stable metal can be deposited at a deposition rate and over a deposition time to produce a stable metal weight percent (wt %) on the support. In some embodiments, the deposition rate and/or deposition time can be controlled so that the catalytic metal weight percent and the stable metal weight percent on the support are approximately the same. For example, a method for forming the thermally stable catalyst system can include depositing the stable metal at a deposition rate of 0.1 μg/s over 2 minutes, followed by depositing the catalytic metal at the same deposition rate and the same time period (0.1 μg/s over 2 minutes) to produce the plurality of metal particles that include a stable metal and a catalytic metal having approximately the same weight percent (wt %). In other embodiments, the deposition time or rate can be adjusted to deposit metal particles having at a higher weight percentage of the catalytic metal relative to the stable metal. In still other embodiments, the deposition time or rate can be adjusted to deposit metal particles having a lower weight percentage of the catalytic metal relative to the stable metal.

Methods of forming a stable catalyst can also include embodiments for formation of the porous support. As an example, preparation of the thermally stable catalyst can include forming the support material into a pellet or other structure characterized by a porosity, surface area, pore volume, and average pore diameter. The material used to form the pellet can be purchased from a supplier or can be synthetically produced. In these embodiments, the raw material (e.g., BN) can be purchased as a powder. Formation of the pellet can be performed using known methods, such as wet extrusion followed by drying. In some embodiments, the material can be molded or formed into a monolith structure. In any of these embodiments, the raw material can be mixed with a suitable solvent to form a slurry. In certain embodiments, the slurry can also include one or more binders. The slurry is then formed into a structure and heated and/or pressed to produce the support.

As another example, the catalyst system can be formed from a support powder obtained from a vendor (e.g., Alfa Aesar, Strem Chemicals, and Sigma). In some embodiments, the support powders can be calcined in air at a temperature (e.g., 800° C.) for a time (e.g., 8 hours) prior to deposition of the metal particles onto the support powder. Following deposition of the metal particles, the support powder having deposited metal particles can be pressed in a die at pressures between about 1,000 psig to about 22,000 psig to form pellets of a desired size, such as between about 0.063- to about 1.00-inch length.

Embodiments of the disclosure include catalyst systems and methods to produce catalyst systems that can encompass a variety of forms. A non-limiting list of forms includes particles and shaped or extruded forms such as spheres, pellets, rings, noodles. In certain embodiments, these forms can be optimized or adapted to different reactors to adjust hydrodynamic flow, providing embodiments with improved or increased exposure of the metal particles to fluid-phase reactants.

The above descriptions are provided, by way of example, for producing catalyst systems having different forms and are not meant to limit the scope of dimensions, shapes, and processes that can be practiced in embodiments disclosed herein.

In embodiments of the disclosure, the deposition of metal particles can be accomplished by a variety of techniques such as wet impregnation, incipient wetness, deposition-precipitation, reduction deposition, ion exchange, strong electrostatic adsorption, and combinations of the same. Further, certain embodiments of the disclosure may utilize electroless deposition (ED) to control the shape and or arrangement of the catalytic metal and the stable metal.

As an example, a combination of deposition methods can be used to deposit a plurality of metal particles having a core-shell arrangement. In these embodiments, the deposition of the metal core preferably occurs first, and can be accomplished any of the techniques above. In one embodiment, deposition of the metal shell preferably occurs second, and the metal shell can be deposited using ED.

Electroless deposition of core-shell arrangements, as may be utilized in some embodiments, is described in U.S. Pat. No. 10,016,751, the entirety of which is incorporated herein by reference. The methods and materials provided in this disclosure demonstrate embodiments which display improvements in methods for producing thermally stable catalytic systems using porous materials and demonstrate embodiments of thermally stable, porous catalytic systems.

The improvements provided in this disclosure produce embodiments that can demonstrate highly stable activity when exposed to elevated reaction temperatures over a reaction time. In an embodiment of the disclosure, an example catalyst system can display an activity loss of less than 25% when exposed to a reaction temperature between about 600° C. to about 900° C. over a reaction time between about 60 hours to about 100 hours. In some example embodiments, the catalyst system can display an activity loss of less than 22% when exposed to a reaction temperature between about 700° C. to about 875° C. In certain example embodiments, the catalyst system can display an activity loss of less than 15% when exposed to a temperature between about 750° C. to about 850° C. In an exemplary embodiment, the catalyst system can display an activity loss of less than 4% when exposed to a temperature between about 800° C. to about 850° C.

EXAMPLE 1

Example 1 discusses a study providing the characterization of exemplary substrate materials. The study supports embodiments of the disclosure that may be understood in conjunction with the Drawings and Description provided herein.

Generally, methods of characterization focused on the porous support material. Several porous supports including $TiO_2$ and BN were subjected to calcining conditions at a temperature of either 600° C. or 800° C. in air for a period of 8 hours. As shown in Table 2.

TABLE 2

Physical properties before and after calcining thermal pretreatment.

| | Boron nitride (BN) | | | Titanium dioxide ($TiO_2$) | | |
|---|---|---|---|---|---|---|
| Sample pretreatment | Surface area (SA, $m^2/g$) | $V_{pore}$ ($mm^3/g$) | Average $d_{pore}$ (nm) | Surface area (SA, $m^2/g$) | $V_{pore}$ ($mm^3/g$) | Average $d_{pore}$ (nm) |
| none | 61 | 210 | 13.7 | 65 | 260 | 13.6 |
| 600° C. | 54 | 180 | 13.8 | 65 | 190 | 12.4 |
| 800° C. | 53 | 170 | 13.1 | 11 | 40 | 11.9 |

Different methods can be used to characterize the material properties of the support before and after calcining. In this study, Brunaeur-Emmett-Tell (BET) methods were used to determine the surface area of the support at different temperatures and pore volumes. Average pore diameters were determined by nitrogen adsorption/desorption isotherms and calculated using the Barrett-Joyner-Halenda (BJH) method. Both surface areas and pore analyses were determined using an automated Micromeritics 2020 Analyzer.

EXAMPLE 2

Example 2 discusses a study providing a comparison of a supported metal catalyst to example embodiments of the disclosure as shown in table 3. The study supports embodiments of the disclosure that may be understood in conjunction with the Drawings and Description provided herein.

TABLE 3

Comparative summary of performance using example catalyst systems.

| Example | Catalyst Composition | Activity loss (% loss 10-70 hrs) | $SO_2$ production rate after 70 hrs (mol $SO_2$/g cat-hr) | Time to zero activity (Est. hr) |
|---|---|---|---|---|
| Comparative | 1% Pt/BN | 60.6 | 0.26 | 107 |
| Ex. 1 | 1% Pt, 5% Ir/BN | 21.3 | 1.55 | 327 |
| Ex. 2 | 1% Pt, 7.5% Ir/BN | 0.0 | 1.77 | na |

In this study, the performance of 3 catalyst compositions was examined in a model high-temperature reaction, the hybrid sulfur cycle (HYS). This reaction is carried out under highly acidic conditions at elevated temperatures. Each of these different examples was exposed to 91.3 wt % $H_2SO_4$ (remainder $H_2O$) at 800° C. for up to 550 hours in some experiments. Generally, the performance of each example over a set time (e.g., 10 hours to 70 hours) was used as a metric to compare the different catalyst compositions. A summary of the results is shown in Table 3, which summarizes the data shown in FIGS. 1, 2A, and 2B.

FIG. 1 shows the production rate of $SO_2$ and $O_2$ in the catalytic decomposition of $SO_3$ promoted by the metal platinum (Pt). In the gas phase, sulfuric acid ($H_2SO_4$) is in equilibrium with sulfur trioxide ($SO_3$) and water ($H_2O$). Thus, tracking the production of $SO_2$ as the reaction product provides a measurement of catalyst performance. FIG. 1 demonstrates results for the comparative example containing 1 wt % of the catalytic metal Pt, supported on boron nitride. As shown in FIG. 1, the catalyst continues to show some activity even after 70 hours; however, the reaction rate has significantly decreased in comparison to the rate after 10 hours. As shown in Table 3, over the time scale of 10-70 hours, the comparative example loses 60.6% activity. This would indicate that the support structure is either collapsing or that the Pt is sintering due to the harsh reaction conditions. Additionally, the $SO_2$ production rates are much lower than values for Ex. 1 and Ex. 2, which demonstrate example embodiments as disclosed herein.

Figure 2A:
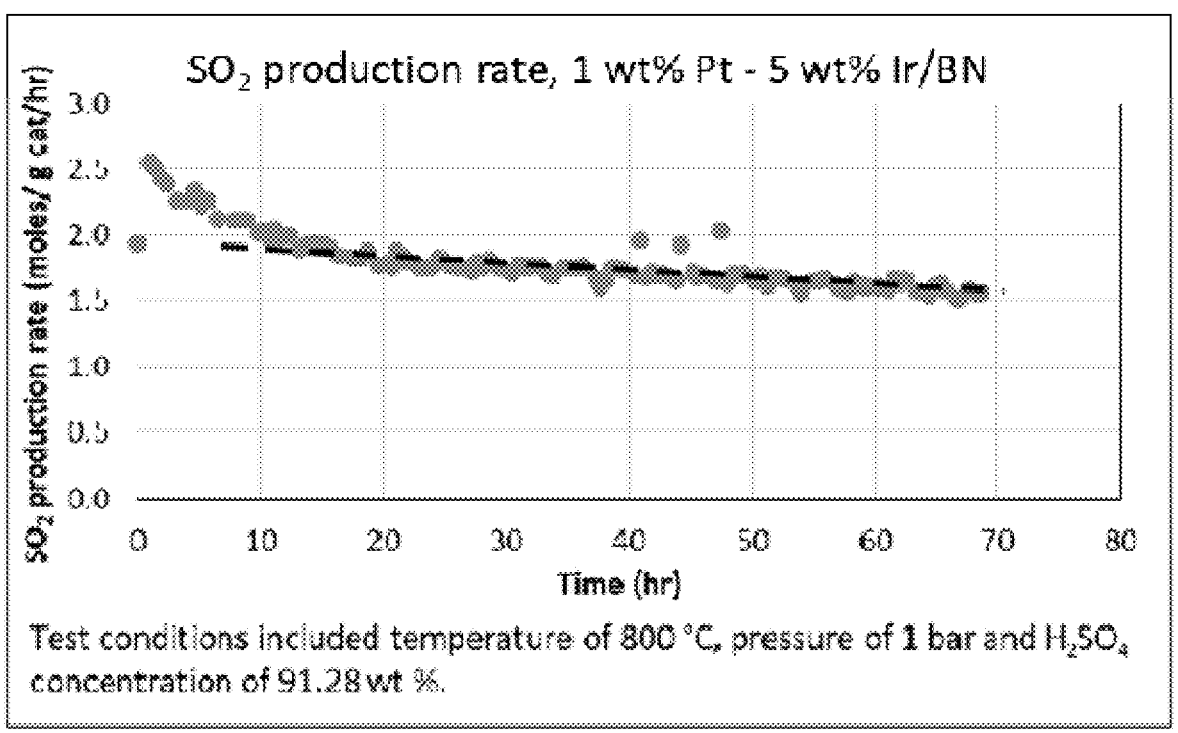
FIGS. 2A-2B illustrate graphs displaying the performance of embodiments of the disclosure that display $SO_2$ production rate versus time.

FIG. 2A shows the production rate of $SO_2$ in the catalytic decomposition of $SO_3$ promoted by the exemplary catalyst system, Ex. 1, which contains 1 wt % Pt, 5 wt % Ir supported on porous BN. The catalyst system includes Pt as the catalytic metal and Ir as the stable metal. As shown in the figure and summarized in Table 3, this exemplary catalyst system displays a 6-fold (approximately 600%) greater $SO_2$ production rate relative to the comparative example after 70-hour exposure to the HyS reaction conditions.

Figure 2B:
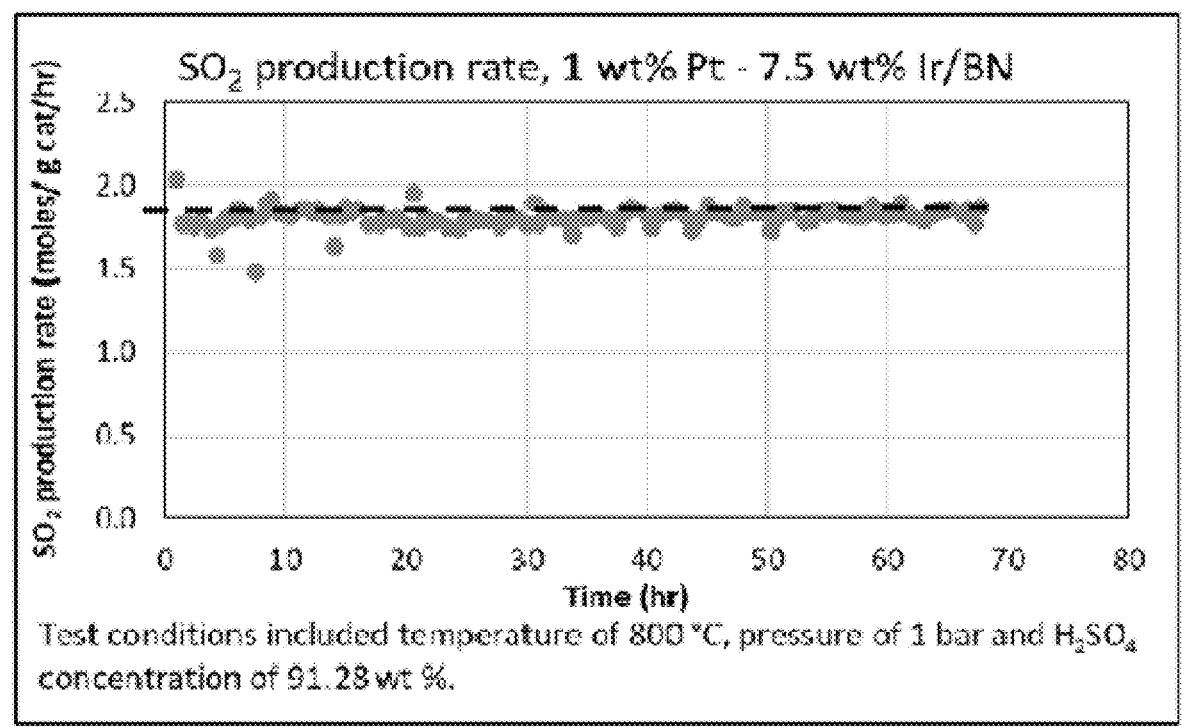

FIG. 2B shows the production rate of $SO_2$ in the catalytic decomposition of $SO_3$ promoted by the exemplary catalyst system, Ex. 1, which contains 1 wt % Pt, 7.5 wt % Ir supported on porous BN. The catalyst system includes Pt as the catalytic metal and Ir as the stable metal. As shown in the figure and summarized in Table 3, this exemplary catalyst system displays a 7-fold (approximately 700%) greater $SO_2$ production rate relative to the comparative example after 70-hour exposure to the HyS reaction conditions.

Figure 3:
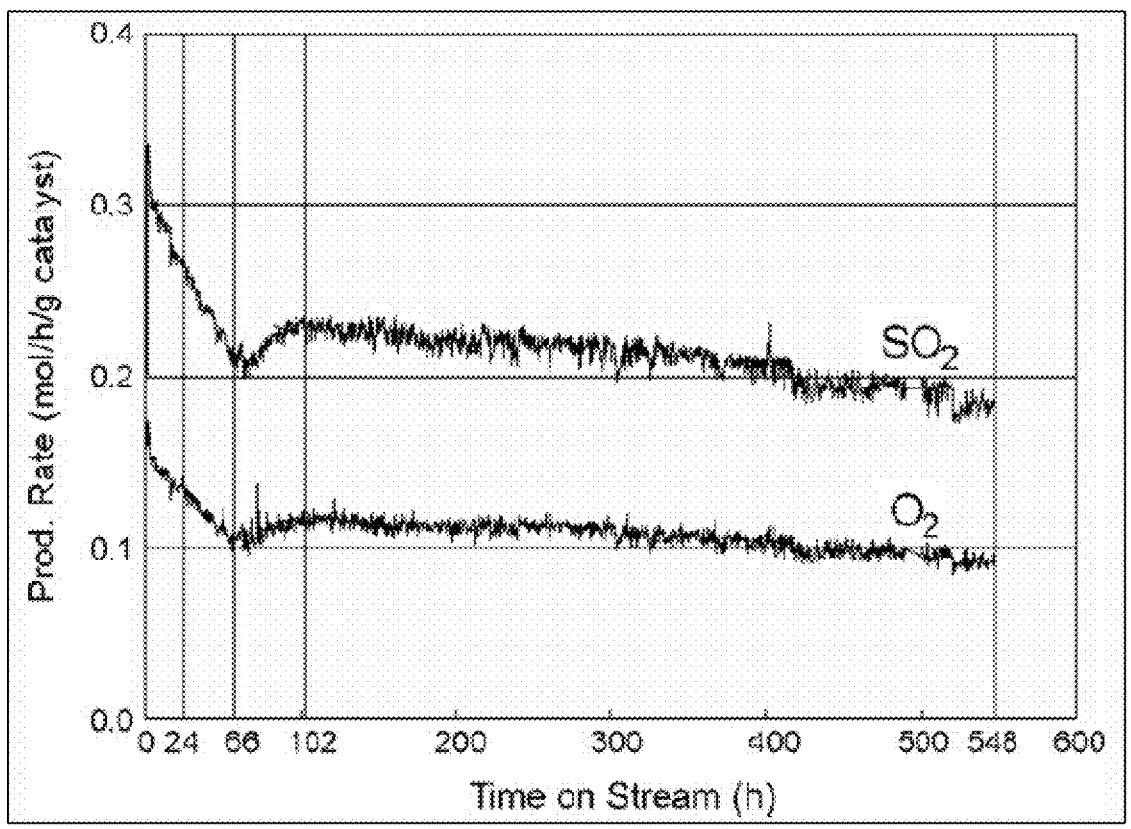
FIG. 3 illustrates a graph displaying the production rate of two product streams versus time.

FIG. 3 shows another example using titanium dioxide. The production rate of $SO_2$ and $O_2$ is shown for a catalyst containing 1% Pt supported on $TiO_2$. For this reaction, the production rate was monitored at 850° C. While the catalyst still shows some activity after 500 hours, the production rate is significantly lower than Ex. 1 or Ex. 2.

The results of these examples indicate that embodiments of the disclosure can provide highly stable catalyst systems that demonstrate sustained activity for up to 70 hours and that can continue to be used for longer periods of time such as at least 100 hours, 200 hours, 300 hours, 400 hours, 500 hours, or 600 hours.

The invention claimed is:
1. A thermally stable catalyst system comprising:
   a. a porous support comprising boron nitride, the porous support having a specific surface area in the range of about 45 m²/g to about 85 m²/g, a pore volume, and an average pore diameter; and
   b. a plurality of metal particles deposited on the porous support,
wherein each of the metal particles of the plurality comprises a stable metal and a catalytic metal, wherein the stable metal is present in the thermally stable catalyst system in a range of from 1 wt. % to 7.5 wt. %, and wherein the catalytic metal is present on a portion of a surface of each of the metal particles of the plurality, and wherein the thermally stable catalyst system has been calcined by a thermal pretreatment at a temperature in the range of about 600° C. to about 1000° C.

2. The thermally stable catalyst system of claim 1, wherein the porous support has a pore volume in the range of about 40 mm³/g to about 220 mm³/g.

3. The thermally stable catalyst system of claim 1, wherein the porous support has an average pore diameter in the range of about 11.8 nm to about 14.2 nm.

4. The thermally stable catalyst system of claim 1, wherein the catalytic metal comprises Pt.

5. The thermally stable catalyst system of claim 1, wherein the stable metal comprises at least one metal from the group consisting of: Co, Ir Rh, Mo, Fe, Nb, Re, Ru, and W.

6. The thermally stable catalyst system of claim 1, wherein each of the metal particles comprise a core region and a shell region, and wherein the stable metal comprises a greater concentration of the core region as compared to the concentration of the catalytic metal and the catalytic metal comprises a greater concentration of the shell region as compared to the concentration of the stable metal.

7. The thermally stable catalyst system of claim 1, wherein each of the metal particles comprises an alloy, and wherein the alloy includes a substantially homogenous distribution of the stable metal and the catalytic metal.

8. The thermally stable catalyst system of claim 1, wherein each of the metal particles are bimetallic, and wherein the catalytic metal is Pt and the stable metal comprises one metal from the group consisting of: Co, Ir, Rh, Mo, Fe, Nb, Re, Ru, and W.

9. The thermally stable catalyst system of claim 1, wherein the catalyst system displays an activity loss of less than 25% over a time period of up to 80 hours exposure to a reaction condition, and wherein the reaction condition comprises a temperature in the range of about 600° C. to about 1000° C.

10. The thermally stable catalyst system of claim 1, wherein the stable metal is present in the thermally stable catalyst system in a range of from 5% to 7.5%.

11. The thermally stable catalyst system of claim 1, wherein the stable metal comprises Ir.

12. The thermally stable catalyst system of claim 1, wherein the stable metal comprises Ir and the catalytic metal comprises Pt.

13. The thermally stable catalyst system of claim 12, wherein Ir weight percent and Pt weight percent are the same in the thermally stable catalyst system.

\* \* \* \* \*